United States Patent
Jacquelin et al.

(10) Patent No.: US 11,549,624 B2
(45) Date of Patent: Jan. 10, 2023

(54) CLAMPING COLLAR

(71) Applicant: CAILLAU, Issy-les-Moulineaux (FR)

(72) Inventors: Arnaud Jacquelin, Mur de Sologne (FR); Christophe Chagnon, Contres (FR)

(*) Notice: Subject to any disclaimer, the term of this patent is extended or adjusted under 35 U.S.C. 154(b) by 179 days.

(21) Appl. No.: 17/093,732

(22) Filed: Nov. 10, 2020

(65) Prior Publication Data
US 2021/0148498 A1    May 20, 2021

(30) Foreign Application Priority Data

Nov. 20, 2019  (FR) ..................... 19 12959

(51) Int. Cl.
*F16L 33/06* (2006.01)
*F16L 23/08* (2006.01)

(52) U.S. Cl.
CPC .............. *F16L 33/06* (2013.01); *F16L 23/08* (2013.01)

(58) Field of Classification Search
CPC ......... F16L 23/08; F16L 23/04; F16L 23/003; F16L 23/162; F16L 23/18; F16L 23/20; F16L 23/22; F16L 33/06; F16L 2201/10
See application file for complete search history.

(56) References Cited

U.S. PATENT DOCUMENTS

| | | | |
|---|---|---|---|
| 3,059,947 A * | 10/1962 | Felburg | F16L 23/08 285/410 |
| 4,655,481 A | 4/1987 | Prueter | |
| 7,399,005 B2 | 7/2008 | Rigollet | |
| 7,425,023 B2 * | 9/2008 | Hartig | F16L 23/08 285/365 |
| 9,016,731 B2 | 4/2015 | Rigollet | |
| 10,228,084 B2 | 3/2019 | Vosgeois | |
| 10,612,705 B2 * | 4/2020 | Prevot | F16L 23/08 |
| 11,313,498 B2 * | 4/2022 | Lenz | F16L 23/08 |
| 2021/0310592 A1 * | 10/2021 | Mesnard | F16L 23/08 |

FOREIGN PATENT DOCUMENTS

| | | |
|---|---|---|
| EP | 1451498 A1 | 9/2004 |
| EP | 2598785 A1 | 6/2013 |
| EP | 3217059 A1 | 9/2017 |

* cited by examiner

Primary Examiner — Robert Sandy
Assistant Examiner — Louis A Mercado
(74) Attorney, Agent, or Firm — Robert Facey

(57) ABSTRACT

Clamping system for connecting two tubes having protruding clamping surfaces. The system comprises a collar having a strip able to cooperate with the clamping surfaces. The strip has a first and a second flank between which an inner recess able to receive the clamping surfaces is delimited. The system has at least one retaining clip having a cross-member which extends across the inner recess, a first and a second wing which extend radially outwardly relative to the cross-member by covering the flanks and a first and a second retaining configuration each having at least one retaining lug. The cross-member is able to be deformed to penetrate into the inner recess.

19 Claims, 8 Drawing Sheets

CLAMPING COLLAR

BACKGROUND OF THE DISCLOSURE

The present disclosure relates to a clamping system for connecting two tubes whose facing ends have clamping surfaces protruding relative to the cylindrical external surface of said tubes, the system comprising a collar having a strip able to cooperate with said clamping surfaces, the collar being able to be tightened by a reduction in the diameter of the strip, the strip having a first and a second flank between which an inner recess able to receive the clamping surfaces is delimited.

A clamping system of this type is known from European Patent No EP 1 451 498. The cross-section of the strip of the collar is for example substantially V-shaped or U-shaped, so that the wings formed by this cross-section respectively bear on the clamping surface of the first tube and on that of the second tube. Thus, the tightening of the collar tends to keep the tubes clamped against each other. The V-shaped cross-section is interesting insofar as, upon tightening of the collar, it brings the tubes closer to each other.

For example, the collar is tightened using a screw system. Thus, the ends of the strip can be raised so as to form bearing lugs provided with bores in which a screw can be inserted. The head of the screw is retained relative to one of these lugs, while a nut is retained relative to the other lug, so that the relative rotation between the screw and the nut drives the tightening of the collar by a decrease in the diameter of the strip. However, this decrease in the diameter of the strip can be achieved differently, for example by hooking of one end of the strip onto the other, particularly using a hook raised relative to the strip and a lug also raised relative to the strip, the hook hooking behind the lug to keep the collar in the tightened state.

In document EP 1 451 498, the clamping system further includes a washer which is secured to the collar by means of fixing lugs that the washer includes, this washer also having lugs which are able to grip on the first tube when the collar is pre-mounted at the end of this first tube. Within the meaning of the present description, "pre-mounted" means that the tube is simply fitted inside the collar, without the latter being tightened. Thus, the fact of retaining the collar in the pre-mounted state around the end of the first tube allows putting it on hold before abutting the two tubes and tightening the strip of the collar around their assembled ends.

European patent No EP 2 598 785 proposes for its part to equip the system with first and second pre-mounting means to pre-mount the collar on the first and second tubes, once they have been brought closer to each other and fitted into the collar. This allows performing the tightening of the collar without having to hold the two tubes in position. In this patent, the first and second pre-mounting means can be formed on a single washer carried by the strip of the collar, particularly by its first flank, else or by two washers, namely a first washer similar to that of the system of patent EP 1 451 498, carried by the first flank, and a second washer carried by the second flank.

European patent No EP 3 217 059 proposes a clamping system comprising a collar of the aforementioned type, a washer and pre-mounting clips. The washer is retained relative to the collar and is provided with lugs allowing pre-mounting on the clamping surface of one of the tubes. The pre-mounting clips are individual clips, which are retained relative to the strip by being pinched on one of its flanks, and allow pre-mounting on the clamping surface of the other tube.

The aforementioned devices are generally satisfactory, but they require the use of one or two washers to perform the pre-mounting on at least one of the tubes. These washers having an inner periphery similar to that of the collar, they represent a relatively large amount of material. In addition, their geometry is relatively complex so that they can be correctly held relative to the strip of the collar over their entire periphery, and can correctly retain relative to the collar the ends of the respective tubes with which they cooperate. Moreover, in some cases, the washer must also perform a function other than that of the pre-mounting, for example a sealing function. In some cases, this function can only be ensured if the washer has a precise thickness, which is not always compatible with the elasticity that the pre-mounting lugs should have in order to correctly perform their function, it being understood that these lugs have in principle the same thickness as the washer since they are made from the same strap.

The combination of a washer and individual clips is interesting for performing a pre-mounting on the clamping surfaces of the two tubes, but it still requires using a washer of complex shape for the pre-mounting on one of the tubes, and also requires mounting the various elements according to different processes.

The disclosure relates to a clamping system for connecting two tubes whose facing ends have clamping surfaces protruding relative to the cylindrical external surface of said tubes, the system comprising a collar having a strip able to cooperate with said clamping surfaces, the collar being able to be tightened by a reduction in the diameter of the strip, the strip having a first and a second flank between which an inner recess able to receive the clamping surfaces is delimited, the system comprising at least one retaining clip comprising:
  a cross-member which extends across the inner recess,
  a first and a second wing which extend radially outwardly relative to the cross-member by covering respectively the first and the second flank, and
  a first and a second retaining configuration each comprising at least one retaining lug which extends radially inwardly relative to the cross-member,
the cross-member being able to be removed upon tightening of the collar. Here, the indication that the cross-member is able to be removed upon tightening of the collar means that, upon tightening of the collar, the configuration of the cross-member changes so that the cross-member does not form an obstacle to such tightening. In particular, the cross-member may deform and/or break.

Optionally, the cross-member extends between the first and the second wing by being optionally attached to inner edges of the wings.

Optionally, the retaining lugs are attached to inner edges of the wings.

Optionally, the strip has an annular ridge portion which extends between the first and second flanks and the retaining clip has ridge lugs covering at least partially the annular ridge portion.

Optionally, the annular ridge portion has a wedging configuration with which the ridge lugs cooperate, the wedging configuration optionally comprising an orifice or a bowl into which the ridge lugs penetrate.

Optionally, in the non-tightened state of the collar, the first and the second wing cover respectively the first and the second flank with a clearance.

Optionally, the first and the second wing are configured to move apart from each other to facilitate the deformation of the cross-member to penetrate into the inner recess.

Optionally, the first and second wings are configured to be disjoined at their outer radial ends.

Optionally, the wings are configured to be able to be removably retained against a spacing of their outer radial ends.

Optionally, the cross-member has at least one edge folded inwardly having an indentation.

Optionally, the indentation comprises a notch delimited between two rim portions, one of the rim portions having optionally a tab-shaped portion extended inwardly.

Optionally, the clamping system further comprises an annular seal disposed inside the strip and cooperating with the retaining clip.

Optionally, the retaining clip is formed in one piece, optionally a metal part cut out and folded from a plate, for example a strap.

Optionally, at least one of the first and second wedging configurations comprises two retaining lugs located on either side of the cross-member.

Optionally, the system comprises a plurality of similar retaining clips, distributed angularly.

Optionally, the cross-member is configured to be deformed to penetrate into the inner recess.

The retaining clip therefore allows performing, in a single element of simple configuration, a pre-mounting relative to the clamping surfaces of the two tubes. It is possible to position the retaining clip in the desired location of the circumference of the strip. Several retaining clips, distributed angularly, can be used. The or each retaining clip alone performs the pre-mounting relative to the two tubes. The engagement areas between the clip and the clamping surfaces are defined by the geometry of the clip, which allows optimizing the distribution of the retaining forces of the pre-mounting. For example, these engagement areas are axially aligned.

When the clamping system further comprises a seal, there is great freedom as to the material of this seal and its geometry, since it can be decorrelated from the part of the system which performs the pre-mounting, that is to say, in this case the pre-mounting clip(s). The seal can in particular be a multilayer or a composite (for example mica-based) seal and/or be made of metal of the stainless steel type having received a surface treatment.

The present disclosure will be well understood and its advantages will become more apparent upon reading the following detailed description of an embodiment represented by way of non-limiting example.

DETAILED DESCRIPTION OF THE OBJECT OF THE DISCLOSURE

The collar of the clamping system according to the present disclosure is for example generally similar to that described in documents EP 1 451 498, EP 2 598 785 and EP 3 217 059.

Figure 1:
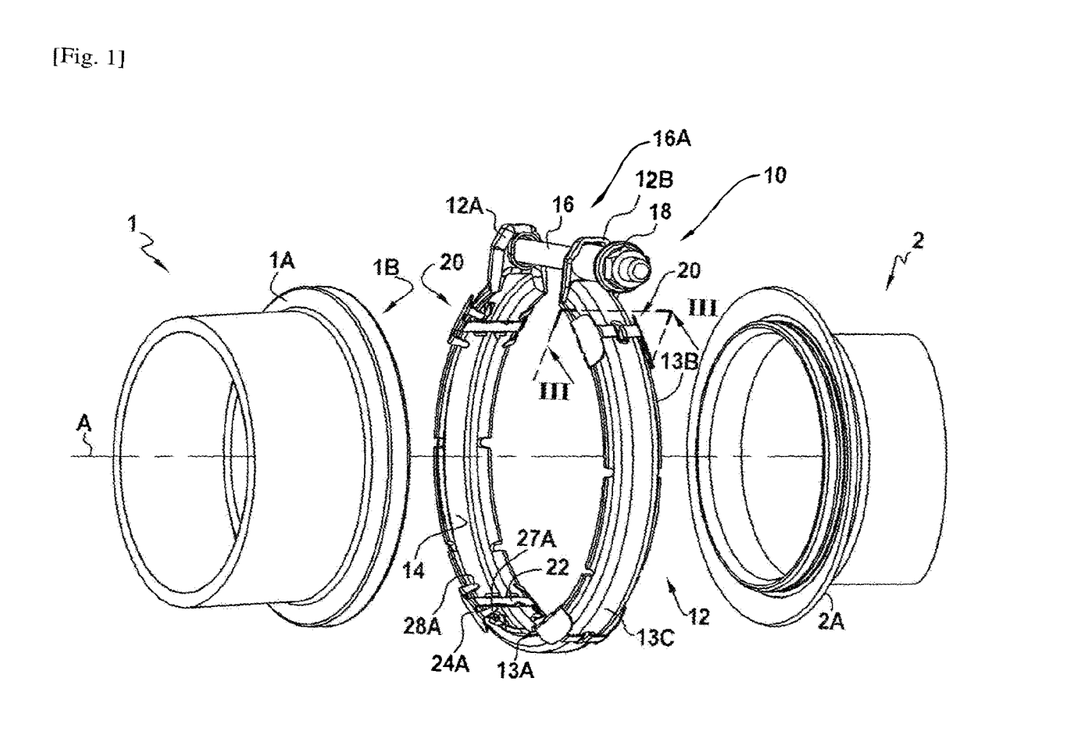
FIG. 1 is a perspective view showing the clamping system and the ends of two tubes before the assembly of this system on these ends.
Figure 2:
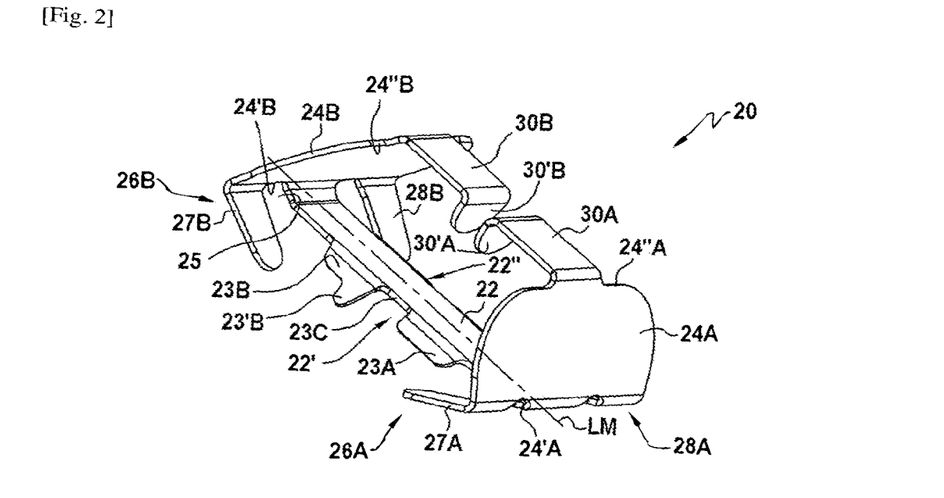
FIG. 2 shows in perspective a retaining clip of the clamping system.
Figure 3:
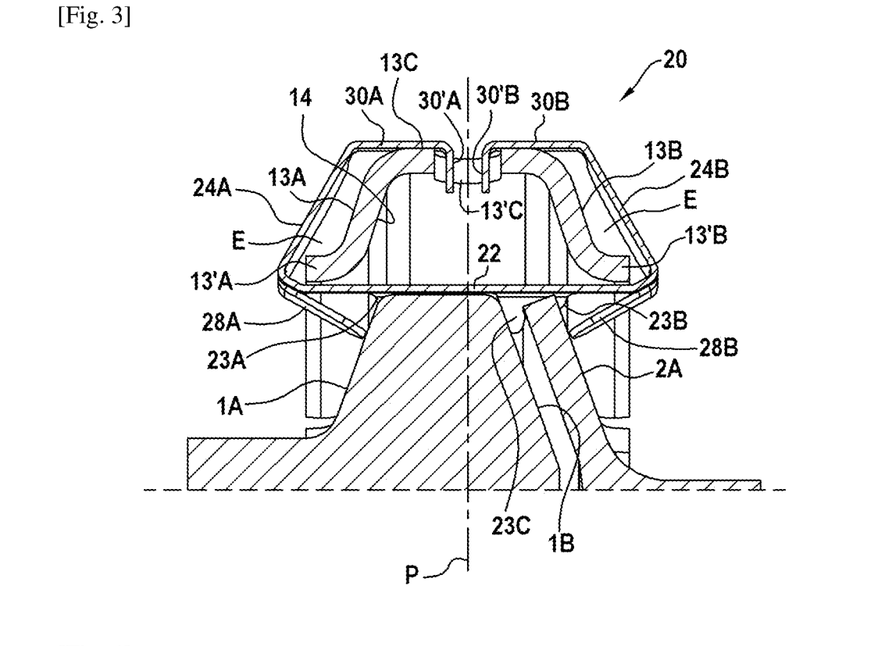
FIG. 3 is a sectional view in plane III of FIG. 1, while the ends of the two tubes are pre-mounted with the clamping system.

Thus, as can be seen particularly in FIGS. 1 to 3, this collar 10 includes a strip 12 which has a first flank 13A and a second flank 13B between which an inner recess 14 is delimited.

In the following, unless otherwise indicated, the elements which are directed towards the axis A of the collar (that is to say the axis A of the ring formed by the strip of the collar) will be referred to as "inner" elements as well as the elements which are closest to this axis A relative to other elements, which, in contrast, will be referred to as "outer" elements, the "outer" elements are also those which are directed away from the axis A.

The clamping system is used to connect two tubes by their ends. Thus, FIG. 1 shows a first tube 1 and a second tube 2, which have respectively a first clamping surface 1A and a second clamping surface 2A protruding relative to their respective cylindrical external surfaces. For the assembly of the tubes 1 and 2, the clamping system can be disposed around the assembled ends of the tubes, so that the clamping surfaces 1A and 2A are located in the recess 14 of the strip 12. In this situation, the flanks 13A and 13B cooperate respectively with the clamping surfaces 1A and 2A, so that the clamping of the collar maintains the two ends.

The strip 12 has for example a substantially U-shaped or V-shaped section. In this case, the section is of the mixed type combining a U and a V shape since the strip has a relatively wide annular ridge portion 13C (the width of the strip being its dimension parallel to the axis A) which in a way forms the base of a U, while its flanks 13A and 13B are inclined like the branches of a V, by being oriented towards the axis A while having tendency to gradually move apart from each other as moving towards their respective inner edges 13'A and 13'B. Furthermore, the flanks 13A and 13B are in this case slightly curved at their inner edges 13'A and 13'B until becoming substantially parallel to the axis A.

For their part, the clamping surfaces 1A and 2A have a diameter which gradually increases towards the free ends facing the tubes, by being for example frustoconical shaped. Thus, the tightening of the collar on the clamping surfaces of the ends of the tubes to be assembled tends to bring these ends closer to each other. In this case, the free end of the first tube 1 has an end surface 1B which, from the top of the clamping surface 1A, is inclined with respect to a radial plane so as to gradually approach the axis of the tube. Particularly, this end surface 1B can have a frustoconical shape adapted to the inner periphery of the clamping surface 2A of the second tube. For the assembly, the axes of the tubes 1 and 2 are obviously aligned and coaxial with the axis A of the collar.

To tighten the collar 10, the diameter of the strip 12 is reduced. In this case, the strip 12 has ends, respectively 12A and 12B, which are raised substantially radially so as to form bearing lugs. These lugs are pierced so as to allow the passage of the rod 16A of a screw 16 through these lugs. In a manner known per se, the head of the screw can be retained relative to the lug 12A, while a nut 18 cooperates with the lug 12B, so that the relative rotation of the screw and of the nut in the direction of the screwing brings the bearing lugs 12A and 12B closer to each other and therefore reduces the internal diameter of the ring formed by the wound strip, which allows tightening the collar. It can also be a threaded rod cooperating with two nuts.

The clamping system includes at least one retaining clip 20 which serves to hold this pre-mounted system at the ends of the tubes 1 and 2. In this case, the clamping system includes a plurality of retaining clips which are distributed angularly according to the circumference of the collar. In this case, the system comprises four retaining clips. It could comprise less or more than that.

It can be seen in FIGS. 2 and 3 that the retaining clip 20 comprises a cross-member 22 which, when the clip is in place on the collar, extends across the inner recess 14, on the inner side of this recess. The clip further comprises a first and a second wing, respectively 24A and 24B which extend radially outwardly relative to the cross-member 22. When the clip is in place on the strip, the wings 24A and 24B respectively cover the first flank 13A and the second flank 13B.

The indication that the wings 24A and 24B extend radially outwardly relative to the cross-member means that these wings project radially outwardly relative to the cross-member. However, as seen in the drawing, they may not extend strictly in radial planes. In this case, the wings 24A and 24B are inclined so as to get closer to each other as they move away from the axis A of the clamping system. Each wing 24A or 24B extends on the outer side of the respective flank 13A or 13B by locally overlapping this flank. Thus, considered together as seen in FIG. 3, the wings delimit a kind of housing in which a portion of the strip of the collar is located.

The retaining clip also has a first and a second retaining configuration, respectively 26A and 26B. As seen in FIG. 3, the first and second retaining configurations 26A and 26B cooperate respectively with the clamping surface 1A of the first tube and the clamping surface 2A of the second tube to keep the system in the pre-mounted state on the ends of the tubes. Each of the retaining configurations comprises at least one retaining lug which extends radially inwardly relative to the cross-member 22. In this case, each of the retaining configurations 26A and 26B comprises two retaining lugs, respectively 27A, 28A and 27B, 28B which, relative to the cross-member 22, protrude radially inwardly. For each wing 24A or 24B, the retaining configuration 26A or 26B comprises in this case two retaining lugs, respectively 27A, 28A and 27B, 28B which extend on either side of the cross-member 22.

The retaining lugs are in this case inclined so as to get closer to a median radial plane P of the collar perpendicular to the axis A, as they approach the axis A. The free ends of the retaining lugs are therefore directed towards this radial plane and towards this axis A. In other words, a retaining lug located on the side of a wing, for example the retaining lug 27A located on the side of the wing 24A gets closer, towards its free end, to a retaining lug located on the side of the other wing, for example the retaining lug 27B located on the side of the wing 24B.

The cross-member 22 extends between the wings 24A and 24B by being attached to their inner edges, respectively 24'A and 24'B. Notches 25 are delimited between the cross-member and each retaining lug, which allows dissociating the deformations and the motions of the retaining lugs and of the cross-member 22. In this case, the retaining lugs 27A, 28A, 27B, 28B are also attached to the inner edges 24'A, 24'B of the wings.

As can be seen in FIG. 3, in the non-tightened state of the collar, the retaining clip being mounted on the strip, the cross-member 22 extends across the inner recess 14, that is to say it forms somehow an inner bridge shape for this recess. In the pre-mounted step, the tops of the clamping surfaces 1A and 2A of the tubes 1 and 2 are located on the inner side of the cross-member 22, possibly by being in contact with the cross-member as shown in FIG. 3. Upon tightening of the collar, the diameter of the strip is reduced and the flanks 13A and 13B are positioned respectively against the clamping surfaces 1A and 2A. This means that these clamping surfaces penetrate into the recess 14. To allow this, the cross-member 22 is removed, for example by deforming until pressing against the inner wall of the recess, as will be described in more detail below with reference to FIG. 14, or by breaking.

As indicated above, the strip 12 of the collar has an annular ridge portion 13C which extends between the first and second flanks 13A and 13B. This annular ridge portion is the area at which the flanks 13A and 13B meet. It can be seen that the retaining clip extends partly radially outside the annular ridge portion 13C. In this case, the retaining clip 20 has ridge lugs, respectively 30A, 30B which partially cover the annular ridge portion 13C. In this case, the ridge lugs 30A and 30B extend the wings 24A and 24B from their outer radial ends 24"A and 24"B. The ridge lugs 30A and 30B are directed towards each other. In this case, the ridge lugs comprise ends, respectively 30'A and 30'B, which are curved in hooks directed radially outwardly, and cooperate with a wedging configuration of the strip. In this case, the wedging configuration comprises an orifice 13'C of the annular ridge portion into which the hooked ends of the ridge lugs penetrate. The ridge lugs and the orifice 13'C thus serve to wedge the retaining clip 20 relative to the strip 12 of the collar. Other wedging configurations could be provided. Particularly, the ridge lugs could be curved into hooks without extending that far radially inwardly, and the orifice could be replaced by a bowl depressed radially inwardly into which these curved ends would penetrate or by another relief cooperating with the wings or the ridge lugs. This conformation allows, in the tightened state of the collar, preventing the wings 24A and 24B from having a tendency to untimely move apart from each other.

The cooperation between the ridge lugs and the wedging configuration thus allow retaining the wings against a spacing of their outer radial ends, but the wings can be moved apart as long as the retaining clip is not in place or when this cooperation ceases.

When the retaining clip is in place on the strip of the collar and the pre-mounting is performed, it is understood that the clamping surfaces 1A and 2A engage radially inside the cross-member 22 at the end of a relative axial movement between the collar and the respective clamping surfaces. During this axial movement, the radial tops of the clamping surfaces 1A and 2A respectively cooperate with the retaining lugs 27A, 28A 27B, 28B respectively so that these lugs are momentarily removed until the clamping surface considered has exceeded the free end of these lugs in the direction of approximation to the median radial plane P. Upon this removal, a lever effect could cause the wings 24A and 24B to move apart slightly from each other, which can be countered by their natural elasticity and/or by the wedging configuration connecting the ridge lugs to the strip as described previously, or connecting the wings together as will be described below.

Once the considered clamping surface 1A or 2A has reached the median radial plane P beyond the free end of the considered retaining lugs, 27A, 28A or 27B, 28B, these retaining lugs can naturally recover their initial position so that their respective free ends bear against the respective clamping surfaces 1A, 2A.

Moreover, in this case, the wedging configuration described above also allows determining the position of the retaining clip according to the circumference of the strip.

It can be seen in FIG. 3 that, in the non-tightened state of the collar, the first and the second wing 24A, 24B respectively cover the first and the second flank 13A, 13B with a clearance, a space E being delimited between the inner surface of the considered wing and the outer surface of the considered flank. This clearance gives a certain freedom of displacement to the wings and to the retaining lugs, facilitating the mounting of the retaining clip on the strip and the removal of the retaining lugs during the pre-mounting as described.

The wings 24A and 24B are not joined at their outer radial ends. In other words, the wings can move apart from each other at their outer radial ends, while they are connected at their inner radial ends through the cross-member 22. Thus, the retaining clip is mounted on the strip through the inside of the latter. To do so, the user has the clip under the strip, moves apart the wings 24A and 24B, and inserts the strip into the inner space arranged between the wings, until bringing back the wings so as to cover the flanks 13A and 13B. In this case, the user also brings back the ridge lugs to the position represented in FIG. 3 and causes them to cooperate.

Figure 4:
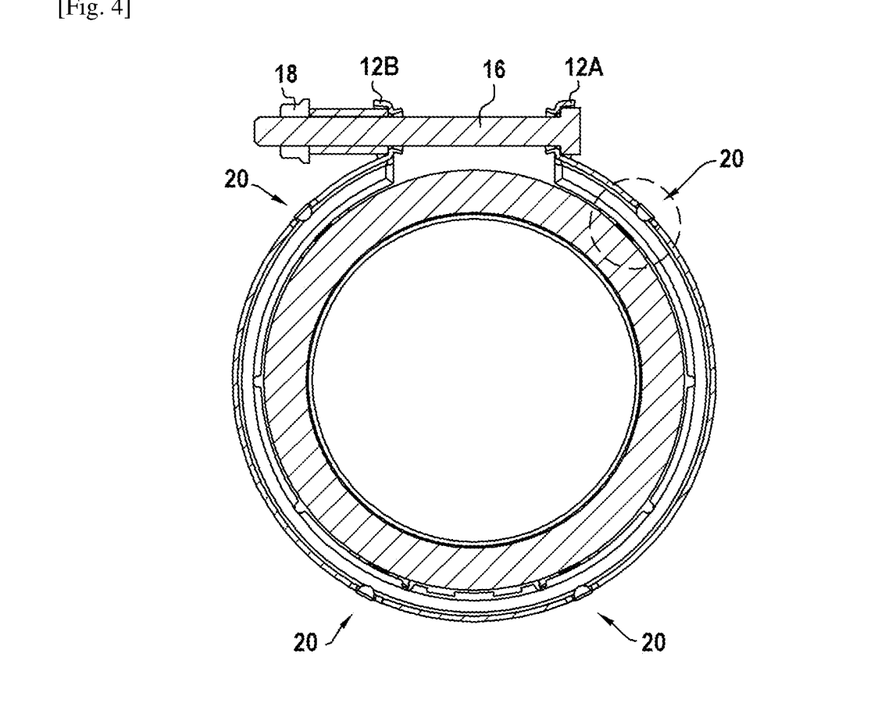
FIG. 4 is a sectional view in a plane perpendicular to the axis A of the collar.
Figure 4A:
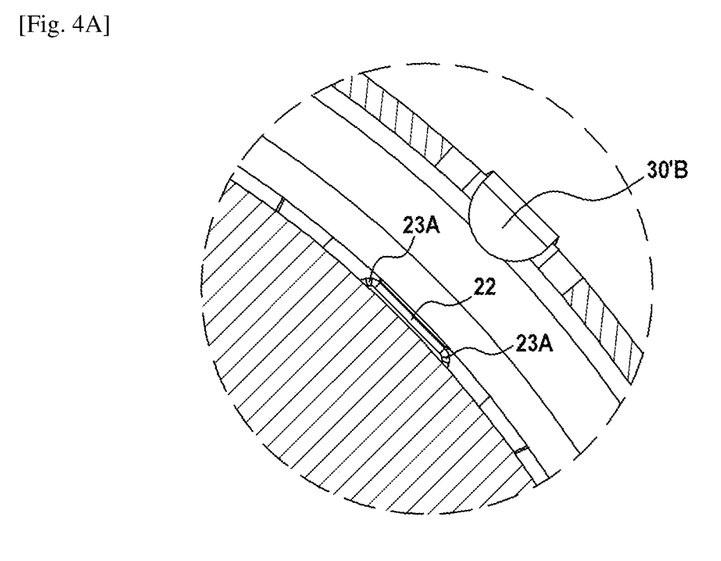
FIG. 4A is an enlargement of part of FIG. 4.

As indicated, the wings 24A and 24B are disjointed at their outer radial ends 24"A, 24"B from which the ridge lugs 30A, 30B extend. Particularly in FIG. 2, the cross-member 22 has at least one folded edge inwardly having an indentation. In this case, FIG. 2 shows one of the edges 22' of the cross-member 22, which is transverse to the axis A. It is seen that this edge 22' has rim portions folded inwardly, respectively 23A and 23B, between which a notch 23C is arranged. The opposite edge 22" of the cross-member 22 is similar by symmetry with respect to a plane perpendicular to the axis A and passing through the center line LM of the cross-member 22, this center line passing through the middle of the width of the cross-member 22, this width being measured parallel to the axis A. The indentation of each of the edges 22' and 22" therefore comprises a notch delimited between two rim portions folded inwardly. The rim portion 23B has a tab-shaped portion 23'B which extends further inwardly. Referring to FIGS. 3 and 4A, it is understood that in the pre-mounted state of the clamping system on the ends of the tubes, the tops of the clamping surfaces 1A and 2A may come into contact with the free edges of the rim portions 23A and 23B, and can help prevent rotation of the tubes relative to the clamping system. This promotes the holding of the clamping system relative to the tube. The portions 23A and 23B can fold outwardly in order to define the diametral dimensions sufficient for the insertion of the clamping surfaces of the tubes into the clamping system.

In the example represented in FIG. 3, the clamping system does not comprise a sealing washer between the tubes. Thus, in the pre-mounted state, a gap is arranged between the end surface 1B of the tube 1 and the inner face of the clamping surface 2A of the tube 2. The tab-shaped portion 23C of the edges 22' and/or 22" of the cross-member fits into this gap, thus contributing to the correct positioning of the clamping system relative to the tubes. Particularly, the tab can contribute to the initial remounting on one of the tubes, by wedging the clamping system on the side opposite to the clamping surface of the considered tube. The tab acts as an abutment upon insertion of the clamping system on the end of this tube.

Upon clamping, as indicated above, the cross-member 22 is deformed to press against the inner wall of the recess 14 of the strip and the tab 23C is removed to allow the ends of the tubes to come into contact.

For the pre-mounting, the various retaining clips are first placed on the strip. Then, the clamping system is brought to the end of one of the tubes, until it is retained on the clamping surface 1A or 2A of this tube by the retaining lugs 27A, 28A or 27B, 28B, then is brought onto the end of the other tube until it is retained on the clamping surface 2A or 1A of this other tube by the retaining lugs 27B, 28B or 27A, 28A.

Figure 5:
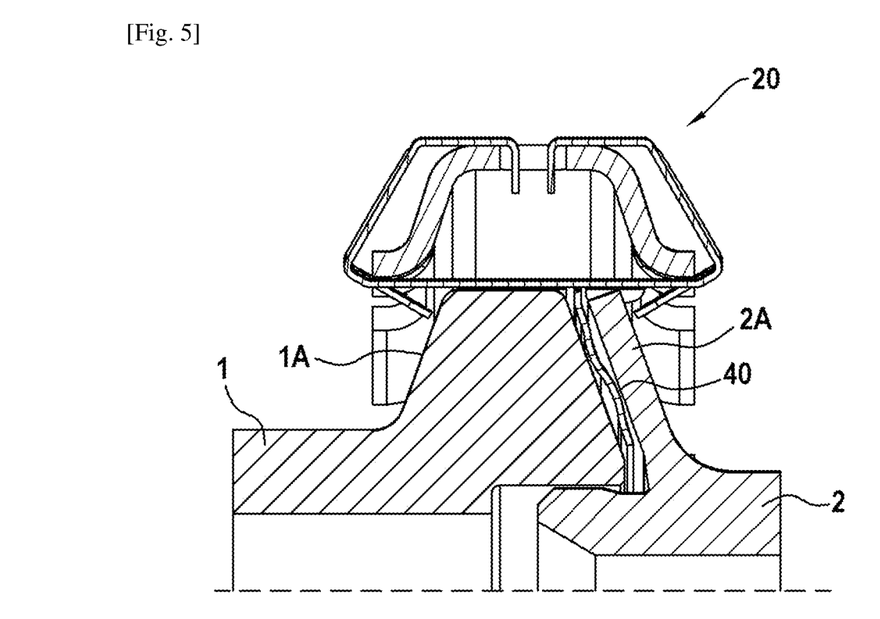
FIG. 5 is a view similar to FIG. 3 for a variant.
Figure 6:
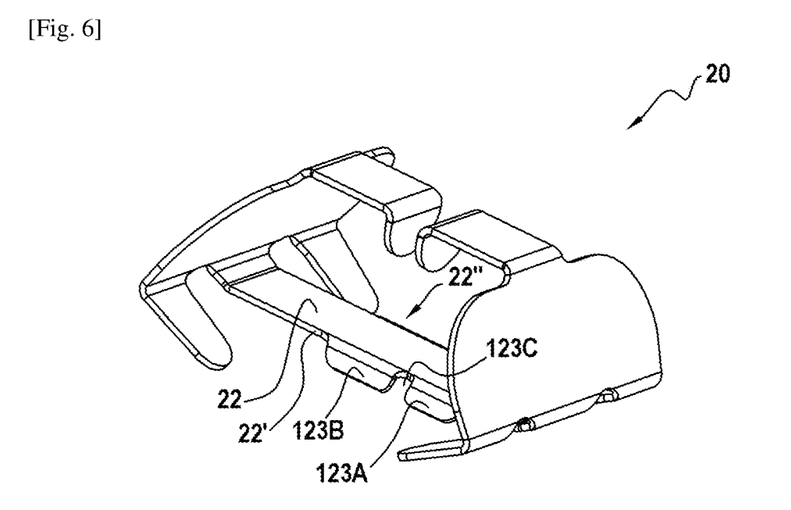
FIG. 6 is a perspective view of a retaining clip used in this variant.
Figure 7:
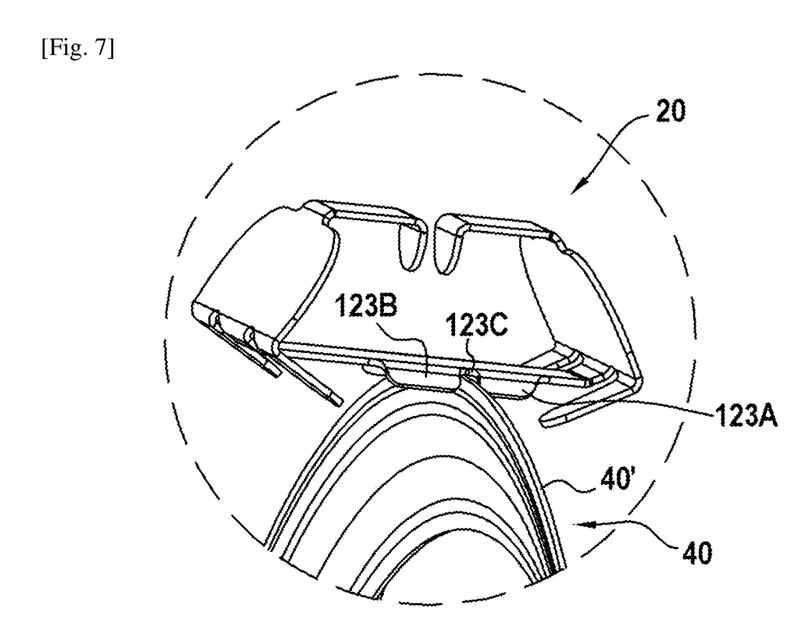
FIG. 7 is a partial perspective view showing the cooperation between such a retaining clip and a seal.

With reference to FIGS. 5 to 7, a variant will now be described. As seen in FIG. 5, according to this variant, the clamping system comprises a washer 40, particularly a sealing washer disposed between the facing surfaces of the tubes 1 and 2. As seen in particular in FIG. 7, this washer has for example the shape of a frustoconical ring having deformations able to be compressed during the clamping of the tubes in order to come into sealed contact with the facing surfaces of the tubes. The retaining clip 20 is practically identical to that of the preceding figures. It differs therefrom by the conformation of the indentations of the folded edges 22' and 22" of the cross-member 22. Indeed, as can be seen in FIG. 6, the indentation of the edge 22' has two rim portions 123A, 123B between which a notch 123C is arranged, but the rim portions do not have a tab-shaped extension unlike the rim portion 23b described above. The rim portions 123A and 123B come into contact with the tops of the clamping surfaces of the tubes like the rim portions 23A and 23B mentioned above. The notch 123C receives the outer annular edge 40' of the sealing washer 40 and therefore wedges the latter axially. Thus, several retaining clips can be first disposed on the strip of the collar, then the sealing washer can be placed in the clamping system such that it is held by the notches 123C of the various retaining clips by thus being "embedded" in the collar. The clamping system can then be pre-mounted at the end of one of the tubes while being retained on its clamping surface 1A or 2A by the retaining lugs 27A, 28A or the retaining lugs 27B, 28B, then brought onto the end of the other tube, while being retained pre-mounted on its clamping surface 2A or 1A by the other retaining lugs 27B, 28B or 27A, 28A to achieve the situation represented in FIG. 5.

Figure 8:
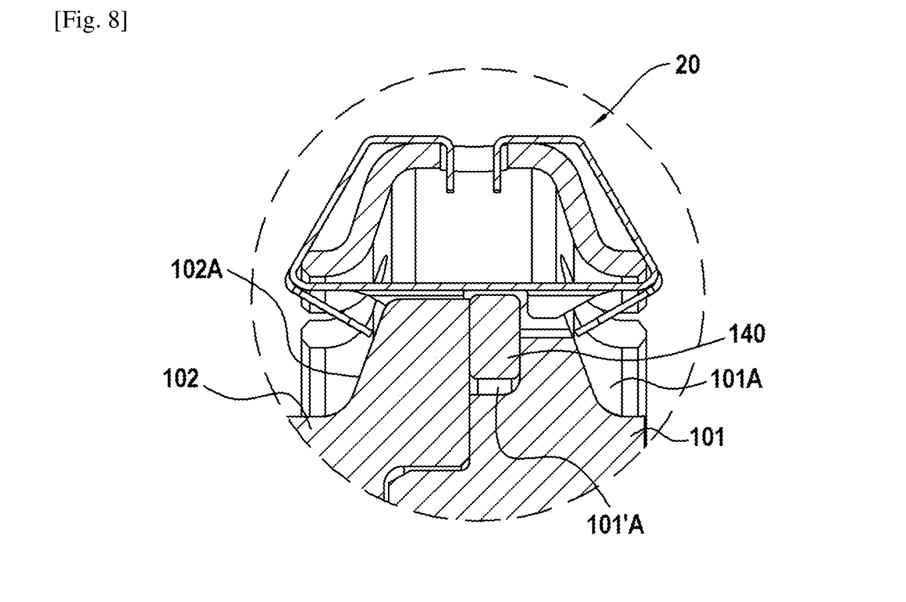
FIG. 8 is a view similar to FIGS. 3 and 5, for another variant.
Figure 9:
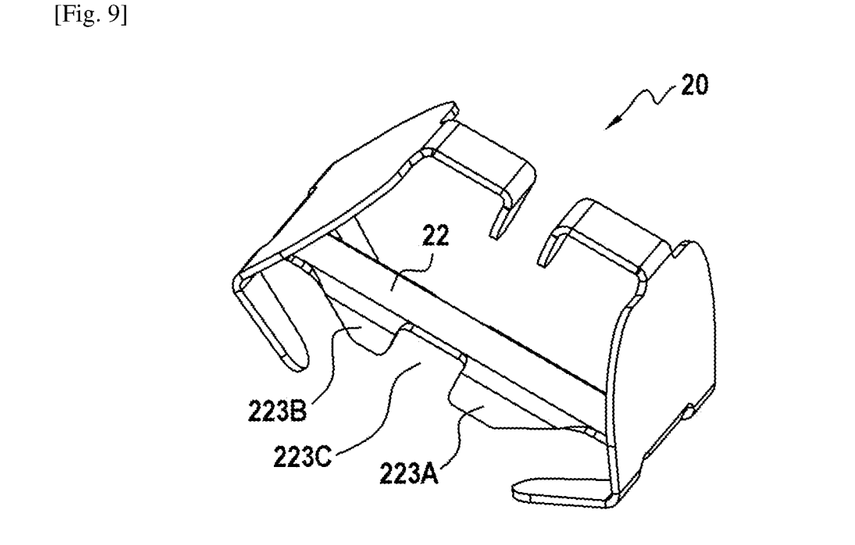
FIG. 9 is a perspective view of a retaining clip used in this further variation.
Figure 10:
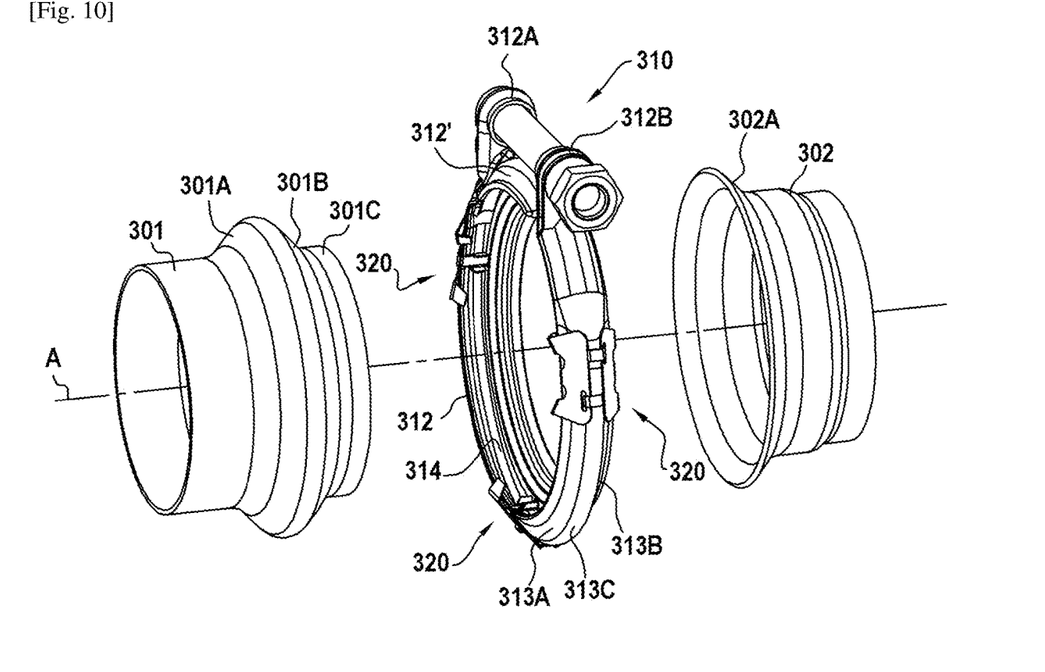
FIG. 10 is a view similar to FIG. 1 for yet another variant.

With reference to FIGS. 8 to 10, another variant is described using a seal of different conformation. In this other variant, the retaining clip 20 is almost identical to the one that has been described previously. The clamping system comprises an annular seal 140 which is for example a bead or the like, made of elastomeric material or of a harder material such as mica. It can be seen in FIG. 8 that this annular seal is disposed between the facing surfaces of the tubes 101 and 102 assembled using the device. These tubes are slightly different from those that have been previously described. They have the clamping surfaces 101A and 102A similar to the clamping surfaces 1A and 2A previously described, but their facing surfaces delimit a housing 101'A to receive the seal 140. In this case, this housing 101'A is arranged by an annular groove at the end of the tube 101. As can be seen in FIG. 9, the indentations of the edges of the cross-member 22 of the retaining clip 20 are slightly different from those that have been previously described. In this case, these indentations comprise, for each edge, a notch 223C arranged between two rim portions 223A and 223B. The width of the notch 223C, measured between the rim portions 23A and 23B, is sufficient to accommodate the thickness of the seal 140. It can be seen in FIG. 8 that the seal 140 is wedged between the rim portions 223A and 223B. This seal can be embedded in the clamping system as described previously with reference to FIGS. 5 to 7.

With reference to FIGS. 10 to 13, another variant is now described. In these figures, the elements corresponding to those of FIGS. 1 to 7 are designated by the same references increased by 300.

FIG. 10 shows the two tubes 301 and 302, with clamping surfaces 301A and 302A similar to those that have been described previously. Beyond the clamping surface 301A, the tube 301 is extended by a sleeve 301C, a surface 301B which approaches the axis A while moving towards the free end of the tube being arranged between the surface 301A and the sleeve 301C. The end of the tube 202 has a flared portion accommodating the sleeve 301C. It goes without saying that this is only an example, the tubes may be similar to those that have been described with reference to the preceding figures.

Figure 11:
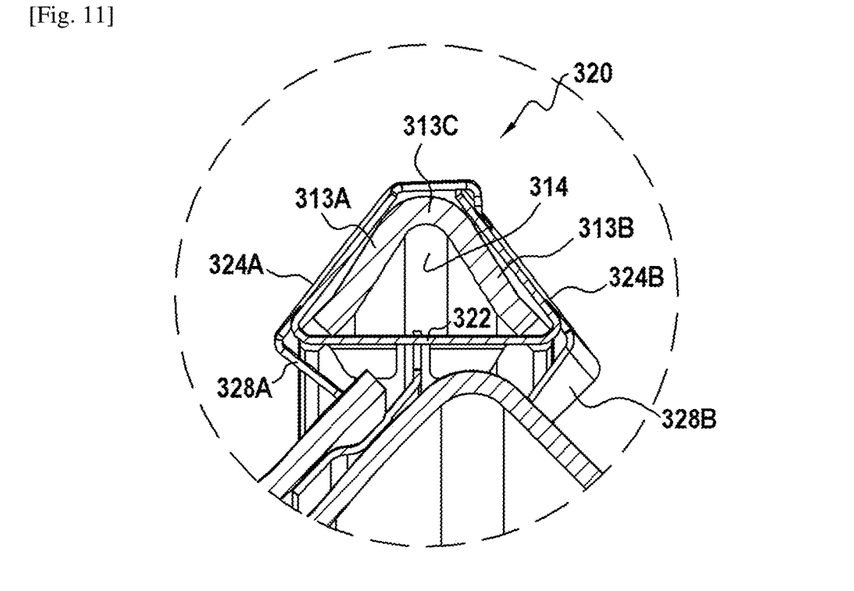
FIG. 11 is a view similar to FIGS. 3, 5 and 8 for this other variant.

The clamping system comprises a collar 310 which comprises a strip 312 which, in this case, comprises a flange 312' extending one of the ends of the strip to bridge the interior space located between the clamping lugs 312A and 312B. In this case, the strip has a V-section, as can be seen in FIG. 11. Thus, the annular ridge portion 313C which extends between the flanks 313A and 313B has a small width measured parallel to the axis A.

Figure 12:
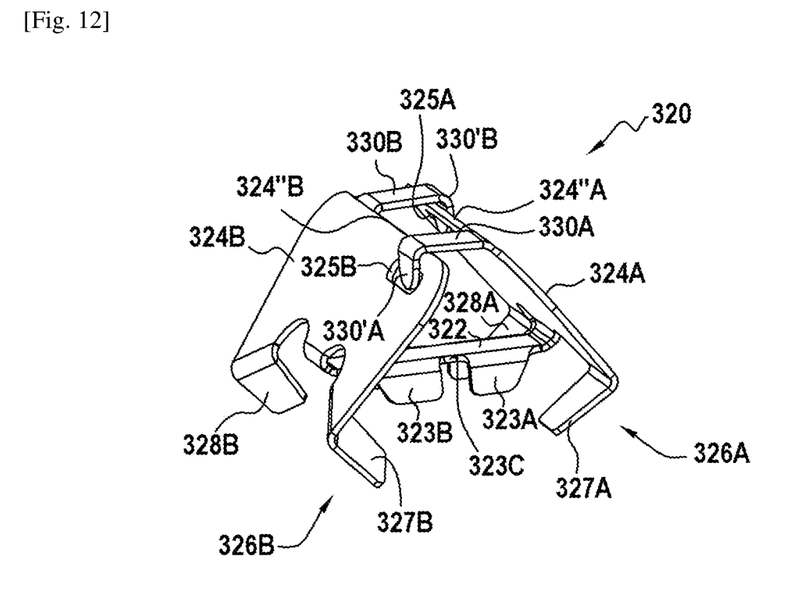
FIG. 12 is a perspective view of a retaining clip used in this other variant.

The retaining clips 320 are slightly different from the clips 20 described previously. The retaining clip 320 comprises the wings 324A, 324B and the retaining conformations 326A and 326B comprising retaining lugs 327A, 328A and 327B, 328B. The retaining clip 320 also has a cross-member 322 similar to the cross-member 22 described previously. The edges of the cross-member 322 have indentations comprising a notch 323C disposed between rim portions 323A and 323B.

This variant differs from the previous ones on the one hand by the conformation of the wedging configurations between the retaining clip and the strip of the collar. In this case, the outer radial ends of the wings 324A and 324B are extended by ridge lugs, respectively 330A and 330B. These lugs are offset along the length of the retaining clip 320, this length being in this case measured according to the circumference of the strip of the collar. The free ends of the ridge lugs, respectively 330'A and 330'B, are folded inwardly to form hooks. Unlike the previous variants, these lugs do not hook into a wedging configuration formed on the strip, but each lug carried by one wing hooks into the other wing. Thus, the wing 324B comprises a hooking portion 325B for the end 330'A of the ridge lug 330A and, likewise, the wing 324A comprises a hooking portion 325A for the end 330'B of the ridge lug 330B. This allows retaining the two wings 324A and 324B relative to each other while preventing their outer radial ends, respectively 324"A and 324"B from having a tendency to move apart from each other. In this case, the hooking configurations 325A and 325B are formed by orifices in the wings. It could be of course different conformations, for example bowls.

Thus, the wings can be retained against a spacing of their outer radial ends, but this retention is removable because the ridge lugs can be unhooked to allow this spacing.

Thus, to place the retaining clip on the strip of the collar, it is ensured that the ends of the ridge lugs are disengaged relative to the hooking conformations, so as to space apart the wings and pass the clip through the inside until the strip 312 is housed in the space arranged between the wings 324A and 324B. These wings can then be closed by hooking the ridge lugs into the hooking configurations.

Figure 13:
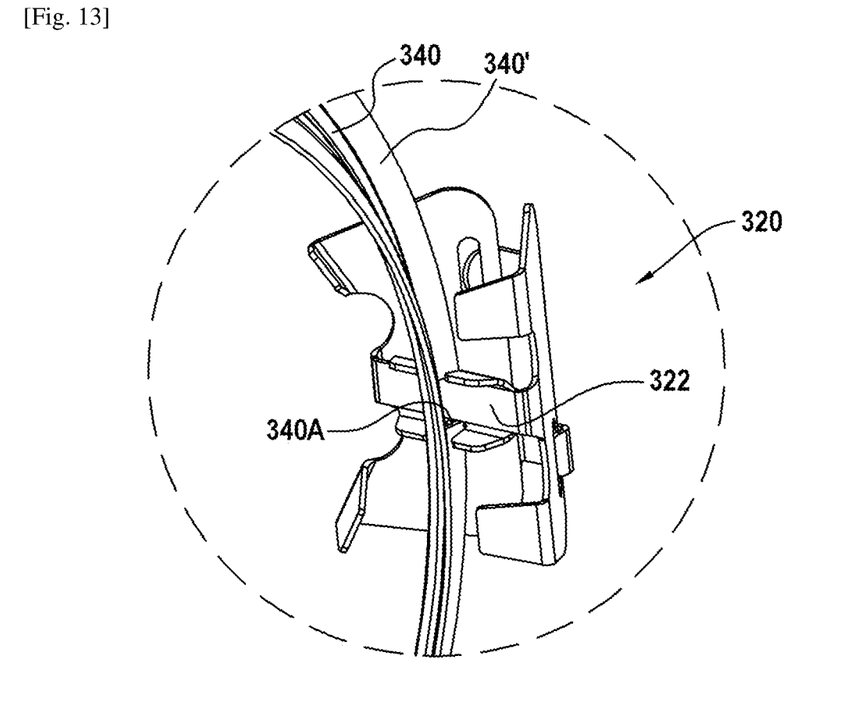
FIG. 13 is a partial perspective view showing the cooperation between the retaining clip according to this other variant and a seal.

Furthermore, this variant differs from the previous ones by the fact that it allows angular setting of the seal 340 relative to the retaining clip. Indeed, as can be seen in FIG. 13, the edge 340' of this annular seal 340 has a notch 340A in which the cross-member 322 of the clip 320 is housed. Of course, there are as many notches 340A as there are clips.

Figure 14:
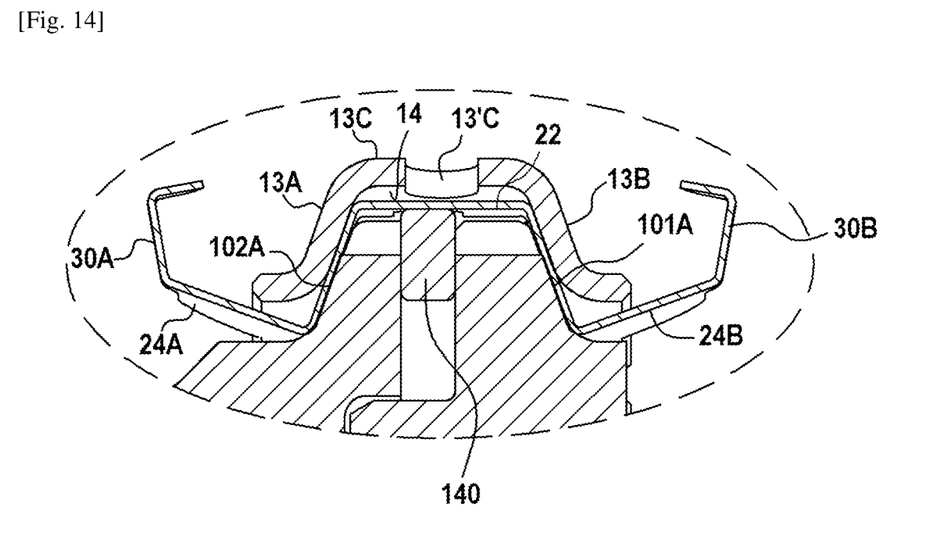
FIG. 14 is a view similar to FIGS. 3, 5, 8 and 11, showing, for the variant of FIGS. 8 and 9, the situation in the tightened state of the collar.

FIGS. 3, 5, 8 and 11 show the clamping system in the pre-mounted state, in which the cross-member of the retaining clip bridges the recess of the strip on the inner side. In this pre-mounted state, the tops of the clamping surfaces of the tubes are located against the inner face of this cross-member without penetrating into the recess of the strip. FIG. 14 shows, for the example of the variant of FIGS. 8 and 9, the situation while the collar has been tightened on the tubes. It can be seen that, in this situation, the retaining cross-member 22 has been pressed against the inner face of the recess 14 of the strip. This deformation caused the spacing of the wings 24A and 24B of the retaining clip. The ridge lugs 30A and 30B are thus unhooked from the orifice 13'C. At the same time, the retaining lugs were pressed against the clamping surfaces 101A and 102A. By its deformation, the cross-member is removed and allows the clamping. Other ways for the cross-member to be removed, for example a rupture, could be developed.

The retaining clip which has been described in relation to the different variants can be formed in one piece, particularly in the form of a metal part cut out and folded from a thin metal plate or strap, for example comprised between 0.2 and 0.6 mm.

The clamping system can be delivered pre-mounted, the retaining clips being in place on the strip of the collar and, when a seal is provided, this seal being also in place by being for example retained in the notches of the indentations that have been described.

The invention claimed is:

1. A clamping system for connecting two tubes whose facing ends have clamping surfaces protruding relative to a cylindrical external surface of said tubes, the system comprising a collar having a strip configured to cooperate with said clamping surfaces, the collar being configured to be tightened by a reduction in a diameter of the strip, the strip having a first flank and a second flank between which an inner recess configured to receive the clamping surfaces is delimited, the clamping system comprising at least one retaining clip comprising a cross-member which extends across the inner recess, a first wing and a second wing which extend radially outwardly relative to the cross-member by covering respectively the first flank and the second flank, and a first retaining configuration and a second retaining configuration each comprising at least one retaining lug which extends radially inwardly relative to the cross-member, the cross-member being able to be removed upon tightening of the collar.

2. The clamping system according to claim 1, wherein the cross-member extends between the first wing and the second wing.

3. The clamping system according to claim 1, wherein the cross-member is attached to inner edges of the first and second wings.

4. The clamping system according to claim 1, wherein the retaining lugs are attached to inner edges of the wings.

5. The clamping system according to claim 1, wherein the strip has an annular ridge portion which extends between the first and second flanks and the retaining clip has ridge lugs covering at least partially the annular ridge portion.

6. The clamping system according to claim 5, wherein the annular ridge portion has a wedging configuration with which the ridge lugs cooperate.

7. The clamping system according to claim 6, wherein the wedging configuration comprises at least one of an orifice and a bowl into which the ridge lugs penetrate.

8. The clamping system according to claim 1, wherein, in a non-tightened state of the collar, the first wing and the second wing cover respectively the first flank and the second flank, a clearance being left between said wings and said flanks.

9. The clamping system according to claim 1, wherein the first wing and the second wing are configured to move apart from each other to facilitate deformation of the cross-member to penetrate into the inner recess.

10. The clamping system according to claim 1, wherein the first and second wings are configured to be disjoined at their outer radial ends.

11. The clamping system according to claim 1, wherein the first and second wings are configured to be able to be removably retained against a spacing of their outer radial ends.

12. The clamping system according to claim 1, wherein the cross-member has at least one edge folded inwardly having an indentation.

13. The clamping system according to claim 12, wherein the indentation comprises a notch delimited between two rim portions.

14. The clamping system according to claim 13, wherein one of the rim portions comprises a tab-shaped portion extended inwardly.

15. The clamping system according to claim 1, further comprising an annular seal disposed inside the strip and cooperating with the retaining clip.

16. The clamping system according to claim 1, wherein the retaining clip is formed in one piece.

17. The clamping system according to claim 1, wherein at least one of the first and second retaining configurations comprises two retaining lugs located on either side of the cross-member.

18. The clamping system according to claim 1, comprising a plurality of similar retaining clips, distributed angularly.

19. The clamping system according to claim 1, wherein the cross-member is configured to be deformed to penetrate into the inner recess.

* * * * *